United States Patent
Smith et al.

[11] 3,734,295
[45] May 22, 1973

[54] SELF-CLEANING FILTER ASSEMBLY

[76] Inventors: Frank T. Smith, 2521 Bona Road; Robert D. Smith, 2407 Kingman Drive, both of Wilmington, Del. 19803

[22] Filed: Aug. 30, 1971

[21] Appl. No.: 175,922

Related U.S. Application Data

[63] Continuation-in-part of Ser. No. 853,321, Aug. 27, 1969, abandoned.

[52] U.S. Cl. ................210/278, 210/279, 210/288, 210/290
[51] Int. Cl. ...........................................B01d 29/08
[58] Field of Search....................210/269, 275, 276, 210/278, 279, 288, 289, 290

[56] References Cited

UNITED STATES PATENTS

| | | | |
|---|---|---|---|
| 524,155 | 8/1894 | Williamson et al. | 210/288 X |
| 678,870 | 7/1901 | Grever | 210/278 |
| 713,759 | 11/1902 | Goade | 210/276 |
| 810,846 | 1/1906 | Cunningham | 210/276 X |
| 1,912,943 | 6/1933 | Lamela et al. | 210/290 X |
| 2,364,775 | 12/1944 | Brice | 210/290 X |
| 3,037,633 | 6/1962 | Veitel et al. | 210/289 X |
| 3,244,197 | 4/1966 | Stilwell | 210/279 X |
| 3,395,099 | 7/1968 | Johnson | 210/275 X |

Primary Examiner—Samih N. Zaharna
Attorney—Wilkin E. Thomas, Jr.

[57] ABSTRACT

Disclosed herein is a filter assembly which can be cleaned by a fluidizing backflow, comprising: a container; a hollow drain structure disposed near the base of said container and having a plurality of openings; a support bed of support particles surrounding the drain structure to a height above the openings therein which equalizes the pressure drop between the top of the support bed and the drain structure over the entire upper surface of the support bed; and a filter bed of filter particles, disposed over the support bed.

20 Claims, 4 Drawing Figures

Patented May 22, 1973  3,734,295

INVENTORS
FRANK T. SMITH
ROBERT D. SMITH

Wilbur E. Thomas Jr.
AGENT

FIG. 2

Patented May 22, 1973

INVENTORS
FRANK T. SMITH
ROBERT D. SMITH

BY *Wilkin E. Thomas Jr.*

ATTORNEY

SELF-CLEANING FILTER ASSEMBLY

CROSS REFERENCE TO RELATED APPLICATIONS

The present application is a continuation-in-part of U.S. application Ser. No. 853,321 filed on Aug. 27, 1969, now abandoned.

BACKGROUND OF THE INVENTION

This invention relates to the field of filtration, particularly to a self-cleaning filter assembly, and more particularly still to the construction of an integral filter and valve structure for a self-cleaning filter assembly.

There are three factors that must be considered in the design of a filter: the effectiveness of the filter in removing contaminants from the process stream, the pressure drop across the filter, and the ease with which the filter can be cleaned. An ideal filter is one that effectively removes contaminants, presents a low impedance path to the process stream and is easily cleaned. These three factors are, however, interrelated in a manner such that the design of a filter which satisfies all of the above conditions is not an easy matter. Generally, the more effective the filter in removing contaminants from the process stream, the greater the pressure drop across it and the higher the pressure needed to force a set amount of process stream through the filter in a given time. The more effective the filter is in removing contaminants, the more easily it becomes clogged with those contaminants, thereby increasing the pressure drop across it, and the more necessary it is to provide a means by which the filter can be cleaned.

The need for an easily cleaned filter assembly is most critical in those areas where shut down of the filter during clean up would be costly and in those cases where the process stream is corrosive. In these circumstances, a self-cleaning or clean-in-place filter is essential, and there is a premium on simplicity of operation. The present invention relates to a simple, clean-in-place filter assembly.

It is an object of the present invention to provide an improved filter assembly in which the pressure drop across the filter is minimized.

It is a further object of the present invention to provide an improved filter assembly of the clean-in-place variety in which the pressure drop across the filter is minimized.

It is a still further object of the present invention to provide a simple clean-in-place filter assembly which can be adapted for use with corrosive liquids.

SUMMARY OF THE INVENTION

In the present invention, these objects are accomplished by providing an elongated cylindrical container, with an opening in its base and an opening in its top, and a hollow, upright, cylindrical drain structure, disposed near the base of said container and having a plurality of openings in its side. A plurality of support particles are disposed within the container, to form a support bed surrounding the drain structure. The upper surface of the support bed is disposed above the uppermost opening in the drain structure by a distance equal to at least the distance between the drain structure and the walls of the container. A plurality of spherical filter particles, having a size and weight that will allow them to settle more slowly in a liquid than the support particles, is disposed over the support bed to form a filter bed. The top of the filter bed is located well below the top of the container so that the filter bed can be fluidized by a fluidizing backflow. An input means for introducing the process stream into the opening in the top of the container and an output means for receiving the process stream after it has passed through the filter bed, support bed and drain structure, is also provided. In addition to this, means for introducing a fluidizing backflow into the container through the drain structure and for allowing the fluidizing backflow to exit the container are provided.

In one embodiment, the process stream enters the top of the container and passes through the filter and support beds to exit through the drain structure which is connected in a leak-tight manner to the opening in the base of the container and to the output means. The output means is adapted to introduce the fluidizing backflow into the filter assembly and the input means is adapted to dispense this fluidizing backflow from the container. In another embodiment, the drain structure extends from the top to the bottom of the container and the filter assembly further comprises a top structure, having at least two ports, capping the opening in the top of said container; and a connecting means provided to simultaneously connect one port to the interior of the container and another port to the interior of the drain structure forming a continuous channel between the ports which leads through the interior of the drain structure, the openings in the drain structure and the interior of the container. The process stream entering one port in the top structure passes through the filter bed, the support bed, the openings in the drain structure and the drain structure, and leaves the filter assembly through a second port. If the flow is reversed, the liquid enters the interior of the container at the base of the container, fluidizing the filter bed before passing out of the filter. When the fluidizing backflow is stopped, the filter particles settle to again form the filter bed on top of the support bed.

In still another embodiment, the connecting means is a structure movably mounted within the top structure so that the two comprise a valve which forms an integral part of the filter, providing a convenient means for changing from the process stream to the fluidizing backflow. The top structure has three ports, and the connecting structure has two channels disposed in a manner such that, in one orientation of the connecting structure, the process stream is filtered by the filter bed and is dispensed from the filter through a second port. In another orientation, the process stream operates as the fluidizing backflow and is dispensed from the filter through a third port. Other configurations allowing complete flexability in the connection of the process stream flow and fluidizing backflow are provided.

In the embodiment in which the drain structure extends from the top to the bottom of the container, the system of external valves and fluid paths characteristic of self-cleaning filters is replaced by a single valve system integrated into the filter assembly in a manner such that the entire operation of the filter assembly can be controlled by manipulation of the single valve. In addition to the convenience provided by such an integrated structure, this embodiment is particularly well adapted for use with a filter medium comprised of particles that are smaller in diameter than the openings in the drain structure and which, without the support bed, would be flushed from the system. For filtering purposes, the small size of the particles in the filter bed is necessary so that, without the support bed, the drain openings would have to be decreased in size and the pressure drop across the filter would be increased. The combination of the support bed and the "high hat" construction of the drain structure allows this pressure drop to be minimized without increasing the size of the particles in the filter bed or decreasing the effectiveness of the filter. In most cases, the pressure drop across the filter assembly can be limited to the pressure drop across the filter medium, the portion due to the drain having been eliminated by the combined use of the high hat construction and the support bed.

Self-cleaning filters using a fluidizing backflow to clean the filter medium in both one and multi-bed filters are well known. A single-bed filter of this type is described in U.S. Pat. No. 524,155 issued to D. C. Williamson et al. on Aug. 7, 1894, and a two-bed filter is described in U.S. Pat. No. 2,364,775 issued to N. E. Brice on Dec. 12, 1944. The problem with utilizing a fluidizing backflow in multi-bed filters is that if the pressure drop across the entire upper surface of the support bed is not equalized, a low resistance path will be provided and an eruption of the fluidizing backflow will occur at this low resistance point, blowing filter particles from the filter assembly. Brice recognized this problem and compensated for it by providing a manifold extending across the entire bottom surface of the filter to act both as his drain structure and the source of his fluidizing backflow. While this solution does insure a uniform distribution of the backflow liquid through the filter, such a manifold is difficult if not impossible to remove for the incessant cleaning or replacement necessary when such a filter system is used with corrosive fluids.

The present invention relates to an improved version of this type of filter utilizing a cylindrical drain structure, which is easy to remove from the container, and providing for the even distribution of backflushing liquid across the surface of the support bed by the disposition of the filter and support bed within the container relative to that drain structure. We have found that to prevent localized eruptions in the support and filter beds in such filters the height of the support bed above the uppermost opening in the drain structure should be at least equal to the distance between the drain structure and the side walls of the container. In small filters the support bed height can be somewhat less than this, but in filters large enough to be used in process streams, this is a minimum criterion. In fact, as the diameter of the filter is increased, the height of the support bed must, for a two-bed filter at least, be increased substantially beyond this minimum. The increase in the height is governed by the empirical criterion that to avoid localized eruptions, the ratio of the incremental longitudinal pressure drop to the incremental radial pressure drop must at a minimum, be no less than 2.7; with 5.0 or even 10.0 being the preferred ratio. In some circumstances, an increase in the support bed height can be tolerated, but, as the height of the support bed increases, the size of filters increases and the pressure drop across the filter also increases. In many circumstances, this is not desirable. In a two-bed filter, however, there does not appear to be any way to avoid the increase; so that if the filter is to be larger than about 2 feet in diameter, the support bed height will have to be increased above the minimum criterion set forth above.

Applicants have, however, found a solution to this problem in the use of a three-bed filter. By dividing the support bed into two beds, one of which is located on top of the other, between the bottom support bed and the filter bed, and comprising particles having a diameter about three times greater than the diameter of the filter particles and about three times smaller than the diameter of the bottom support bed particles, a much shorter total support bed can be used; one in which the minimum height must still be maintained but in which this minimum height need not be greatly exceeded as the diameter of the container is increased. The ratio of the thickness of the two support beds is dependent on the radius of the container, but so long as the thickness of the upper support bed exceeds about one quarter of the lower support bed, a relatively short total support bed can be maintained. The height of the filter bed is of course dependent on the efficiency of the filtering desired.

The size of the particles used in each one of the beds is ultimately determined by the size of the contaminants that have to be removed from the process stream. It has been determined that, if the filter is used as an acid filter, filter particles having a diameter in the range of 0.062 to 0.250 inch, preferably 0.125 inch, will provide sufficient filtering; and that, if the filter is to be used to filter process water from various sources, filter particles having a diameter of about 0.030 to 0.062 inch will provide sufficient filtering for most purposes. The filter bed should, therefore, consist of particles having a diameter of 0.03 to 0.25 inch. To support these filter particles, the support bed just below the filter bed should consist of particles having a diameter of about two to four times, preferably three times, that of the filter particles, i.e., about 0.10 to 0.75 inch. If a third, bottom, support bed is used the particles should again have a diameter of about two to four times, preferably three times, the diameter of the particles in the bed above, i.e., about 0.30 to 2.25 inches.

Care should be taken in the choice of filter and support bed particles so that only the upper, filter bed, fluidizes during the backflush cycle. This can usually be accomplished by using particles made from the same material and relying on the difference in diameter between the filter particles and support particles to insure that only the filter bed is fluidized. One simplified index to whether this will occur is a comparison of the terminal settling velocity of the balls which is proportional to $r(p-p_o)$ when $r$ is the radius of the particle, $p$ is the specific gravity of the particle and $p_o$ is the specific gravity of the liquid. For a three-bed acid filter, using glass balls with a specific gravity of 2.4 and diameters of one-eighth inch, three-eighths inch, and 1⅛ inches, respectively, in conjunction with an acid having a specific gravity of 1.8, the flow required to fluidize the particles in each bed respectively would have the ratio 1:3:9. There are other, perhaps more accurate, indexes such as a comparison of the flows required for incipient fluidization of each bed, but the simple calculation discussed above should suffice for comparison purposes.

In some cases it is difficult to maintain the flow in a process line constant enough so that only the filter bed and not the top support bed fluidizes. For this reason it is often advantageous to increase the flow necessary to fluidize the top support bed while still maintaining the size of the particles in the range specified. This can be done by using particles made from a heavier glass, such as leaded glass, having a specific gravity of between 3.5 to 4.2, for the top support bed. Using three-eighths inch particles made from glass having a specific gravity of 3.5 as the top support bed, the above ratio becomes 1:8.5:9 which provides a spread between the flow required to fluidize the filter bed and the top support bed which can easily be maintained.

The use of particles made from materials having differing specific gravities also makes it possible to construct an "ideal" filter in which the filter bed is composed of particles having a diameter larger than those in at least the upper support bed. The filter is an "ideal" filter because the larger particles in the filter bed filter out the larger contaminants while the smaller particles in the support bed filter out the smaller contaminants. In this way the interstices between the small particle in the support bed will not become clogged with the larger contaminants which have been retained in the larger interstices of the filter bed. To provide for fluidizing filter bed, without fluidizing the support bed, or at least the upper support bed, resort must be had to materials with different specific gravities. For example, if the filter bed and bottom support bed of the acid filter described above are composed of glass balls having a specific gravity of 2.4 and diameters of three-fourths inch and 1⅛ inches respectively, and the upper support bed is composed of glass balls having a specific gravity of 4.5 and a diameter of three-eighths inch, then the ratio of the flow required to fluidize the particles in each bed, respectively, would be about 9:20:13. It is then possible to fluidize the filter bed without fluidizing the lower bed, even though the filter bed is composed of particles which are larger than those used in the upper support bed.

The operation and advantages of the present invention can best be further described by reference to the following figures, wherein.

DETAILED DESCRIPTION OF DRAWINGS

Figure 1:
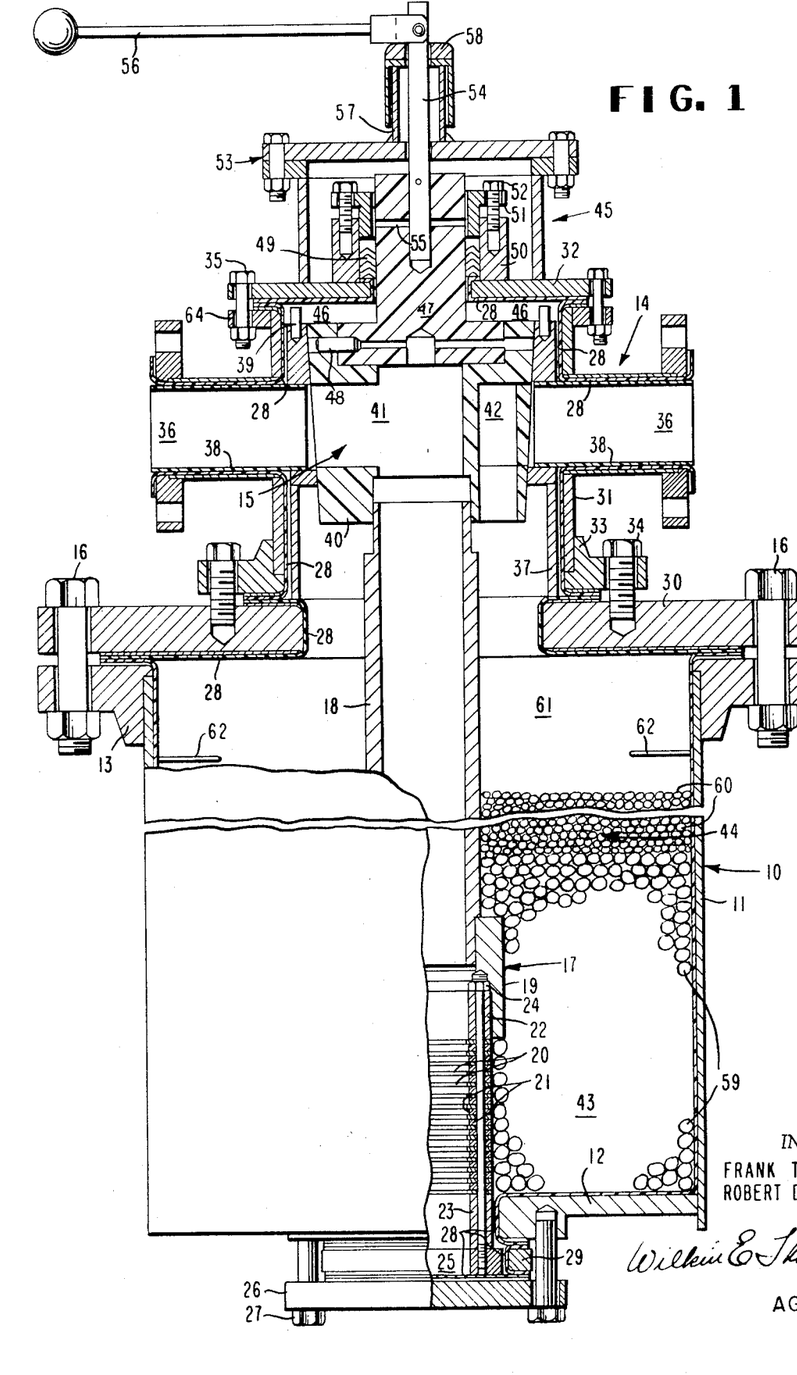
FIG. 1 is a partial cross-sectional side view of one embodiment of the present invention utilizing a two-bed construction.

Referring to FIG. 1, the container 10 is an open topped cylinder 11, having a base 12 and a flange 13 to which the top structure 14 and connecting structure 15 are connected by bolts 16. The drain structure 17 is a hollow drain structure, extending from the base of the container to the top of the container, having a plurality of openings in the portion thereof located near the base of the container. To decrease the pressure drop across the system the total open area of the drain should be at least equivalent to the cross-sectional area of the input conduit. In this embodiment, the drain structure comprises a tube 18, a connecting sleeve 19, a plurality of disc-shaped rings 20, disposed above one another, and a plurality of spacers 21, separating the disc-shaped rings from one another in a manner such as to form a plurality of openings in the drain structure providing the only direct connection between the interior of the drain structure and the interior of the container. Top and bottom spacers 22 and 23, respectively, are provided to position the series of disc shaped rings with respect to the connecting sleeve 19 and the base of the container 12, and a plurality of bolts 24 are provided to align and maintain the disc shaped rings and spacers in place. The disc-shaped rings can be made from a pliable material that will flex under the force exerted on them by the fluidizing backflow to release any particles that might be trapped in the spaces between the spacers.

In the configuration illustrated, the drain structure is connected to the base of the container through an opening in the center of the base. The disc shaped rings and the spacers extend through the opening in the base of the container and are mounted on a first base plate 25 which is attached in a leak-tight manner to the base of the container by means of a second base plate 26 and bolts 27. As illustrated, the container and drain structure are cylindrical in shape. Any substantially cylindrical shape can be used which provides an elongated container to house the filter medium and drain structure. The container and top structure can be made from any rigid material that will withstand the pressure differential. In this configuration, the entire container and top structure are lined with a liner 28 so that a ring 29 is provided to aid in sealing the opening in the base of the container without breaking the continuity of the liner. As illustrated the entire drain structure, from the first base plate 25 to the top of the tube 18, is fixed with respect to the container, so that the only direct path between the interior of the drain structure and the interior of the container is through the openings in the drain structure between the disc shaped rings at the base of the container.

The top structure comprises a first top plate 30, a connecting tube 31, and a second top plate 32. The connecting tube has a lower flange 33 which is connected to the first top plate by bolts 34, an upper flange 64 which is connected to the second top plate 32 by bolts 35, and a plurality of ports 36, each in themselves flanged to mate with appropriate fluid lines.

The connecting structure comprises a tubular liner 37, with openings therein mating with the ports in the top structure, and a cone shaped movable portion 40. Plug liners 38 are provided to connect the ports in the top structure with the tubular liner 37 in a manner such that the tubular liner 37 is prevented from moving, particularly from rotating, within the top structure. Pins 39 are provided to prevent vertical motion of the tubular liner. The tubular liner 37 has a cone shaped passage within it into which the movable portion of the connecting structure 40 is mounted in a manner such that it can rotate about an axis perpendicular to the plane in which the ports are located. The movable portion of the connecting structure is provided with two channels. One channel 41 is provided to connect one of the ports to the interior of the drain structure, and the other channel 42 is provided to connect a second port to the interior of the container.

Figure 2:
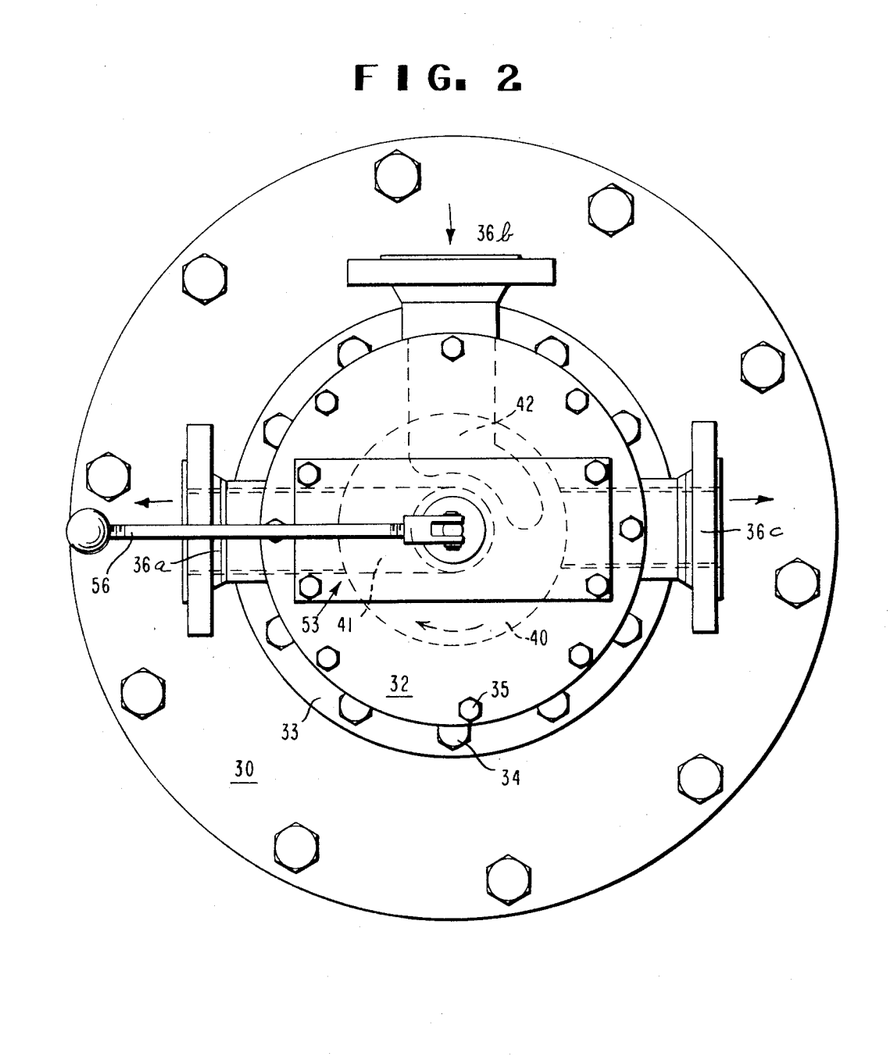
FIG. 2 is a top view of the same embodiment.

The positioning of the ports and passages can best be seen by reference to FIG. 2 which is a top view of the filter assembly illustrated in FIG. 1. In the illustrated configuration, there are three ports oriented at 90° with respect to one another, and two channels, the ends of which are adapted to mate with the ports also being oriented at 90° with respect to one another. The process stream enters port 36b and, in the orientation of the movable connecting portion illustrated, is passed through channel 42 into the interior of the container through the filter and support beds and then the drain structure to emerge through channel 41 and port 36a. By rotating the movable connecting portion by 90°, the process stream which enters port 36b first enters the drain structure through channel 41 through the drain structure and then enters the interior of the container through the openings in the drain structure near the bottom of the container in a manner such as to fluidize the support bed 43 and the filter bed 44 before emerging through channel 42 and port 36c. In this configuration, the ports and channels are oriented at 90° relative to one another. It is obvious that they could be oriented relative to each other at any angle up to and including 120° with respect to one another so long as the angle between ports 36a and 36 b, the angle between ports 36b and 36c and the angle between ends of channel 41 and 42 adapted to mate with the ports are all equal.

In the configuration illustrated, the process stream is utilized as the fluidizing backflow, which is both convenient and in some cases necessary if the filter cannot be contaminated. The filtrate passes out one port 36a, and the fluidizing backflow passes out another port 36c. If it is not convenient or necessary to use the process stream as the fluidizing backflow, then the top structure can be provided with four ports, two to handle the process stream flow and two to handle a separate fluidizing backflow. In this configuration, the angle between the first two ports, the angle between the second two ports and the angle between the ends of the two channels adapted to mate with the ports must all be equal. One simple way to achieve this is to have the process stream ports oriented at 180° with respect to one another, the fluidizing backflow ports oriented at 180° with respect to one another, and the ends of the channels oriented at 180° with respect to one another.

Returning to FIG. 1, the integrated filter and valve illustrated is designed for use with a corrosive liquid. Liner 28, therefore, is made from a noncorrodable material such as Teflon fluorocarbon resin and the parts of the filter and valve within that liner are also made from a noncorrodable material. Since plastics such as Teflon, which are useful as the noncorrodable materials, have a tendency to flow during periods of valve immobility, it may be difficult to break the bonds that have formed between the tubular liner 37 and the movable connecting structure 40 if the valve has not been used for some time. For this reason the valve, and especially the means for rotating the connecting structure 45, have been constructed so that any bond that has been formed can be ruptured prior to an attempt to rotate the valve, so that the valve can thereafter be rotated easily. This is accomplished by providing an open area 46 between the upper top plate 32 and the top of the movable connecting structure 40. As previously indicated, the movable connecting structure is in the form of a cone which, in addition to rotation, can be moved vertically. The means for rotating the movable connecting structure 40, therefore, comprises a connecting cylinder 47, connected to the top of the movable connecting structure 40 by a pin 48 and passing through an opening in the upper top plate 32. A gasket 49 is provided to make a leak-tight seal between the upper top plate 32 and the connecting cylinder 47 which will still allow the structures to move relative to one another. The gasket 49 is confined by flange 50 and keeper ring 51 which is attached to flange 50 by bolts 52 in a manner such that the gasket can be tightened at will. A yoke 53 and a rod 54 passing through the yoke and connected to the connecting cylinder 47 by pin 55 are also provided. A lever arm 56 is connected to the rod. The yoke 53 is provided with a flange 57 having a rounded cap 58 through which the rod 54 passes so that the lever arm 56 can be used to both rotate the movable connecting structure, or to raise the movable connecting structure by moving rod 54 upward, using the edges of cap 58 as a fulcrum.

The top structure and connecting structure described above are in the form of a valve. It must be realized, however, that if external valving is convenient, the design of the filter assembly can be simplified by making the connecting structure 15 an immovable connecting structure, provided merely to connect one of two ports in the top structure directly to the interior of the container, and the other port directly to the interior of the drain structure. The low pressure drop and self-cleaning features of the filter would still be present, but the convenience of an integrated filter and valve would be relinquished for simplicity of design.

The design of the present invention can be further simplified in a number of ways. The openings in the drain structure, instead of being formed from a plurality of disc shaped rings, as illustrated, could be formed from a plurality of holes in a single tube. The present design has the advantage of maximizing the open area of the drain while keeping at least one dimension of the opening small enough so that the support bed particles will not pass through these openings.

Also, in the configuration illustrated, the drain structure is connected to the base of the container so that a movable connection between the drain structure and the movable connecting structure must be provided. In FIG. 1 this is provided, at the point where tube 18 mates with movable connecting structure 40, in a manner such that the two parts can be rotated with respect to one another and also moved up and down relative to one another. This movable connection could have been provided at the bottom of the tube 18, at the point where it joins sleeve 19, or anywhere midway between. This movable connection could be dispensed with if the drain structure were unattached to the base of the container and fixedly attached to the connecting structure so that it would move with it. To make the drain structure move with the connecting structure may be preferable in some circumstances, but the design illustrated has at least two advantages. If the valve parts are made from deformable plastics, the upward motion of the movable connecting structure to free it for easy rotation is quite useful. This motion would be impossible in the case when the drain structure hangs from the connecting structure, because of the possibility that support bed or filter bed particles would work their way underneath the drain structure, preventing its return to the normal position. When the movable connecting structure is in its uppermost position there is a slight leak around it, even though the entire filter assembly is leak tight. This slight leak around the movable valve part can usually be tolerated for a short time, but the structure must be designed so that it can be returned to its normal seated position as soon as possible so the leak does not continue. Blockage of this return movement by particles located under the drain structure should be avoided. If the drain structure moves with the connecting structure, this can be avoided by using support bed particles too large to get underneath the drain, or by using materials which will not bond together so that the valve does not have to be freed by up and down movement.

To act as a filter, the container must have a filter bed adapted to remove contaminants and further adapted to be cleaned by a fluidizing backflow. In the configuration illustrated, the filter is a two bed filter. The first bed is a support bed 43, composed of first particles 59 having a diameter of about one-eighth inch, which surround the drain structure to a height above the uppermost opening the drain structure. The second bed is a filter bed 44 of second particles 60 having a diameter of about three-eighths inch, which is disposed on top of the support bed. In the embodiment illustrated for a filter to be used for corrosive liquids, the filtration is provided by supplying a plurality of small filter particles which pack closely together forming a mesh through which gross contaminants cannot pass. They are made from a glass-like or ceramic-like material and are spherical in shape so they can be easily fluidized and will easily settle into a tightly packed arrangement. The support bed particles must be large enough so that they will not pass through the openings in the drain structure and the filter particles must be small enough to provide filtering capacity without materially increasing the pressure drop across the filter. They must also be large enough so that they won't fit in the spaces between the support bed particles and thereby work their way out of the filter through the drain structure. If the support bed particles range between two to four times the diameter of the filter bed particles, this criterion seems to be satisfied.

For this invention to operate the process stream must enter the container above the top of the filter bed and exit the container below the filter bed, and the fluidizing backflow must flow in the opposite direction. The elongated drain structure 17 provides the path connecting the proper port in the top structure with the region below the filter bed so that this is possible. Breaking bars 62 are provided to break up the support bed and filter bed into individual particles if they have a tendency to stick together rather than fluidize.

Figures 3A, 3B:
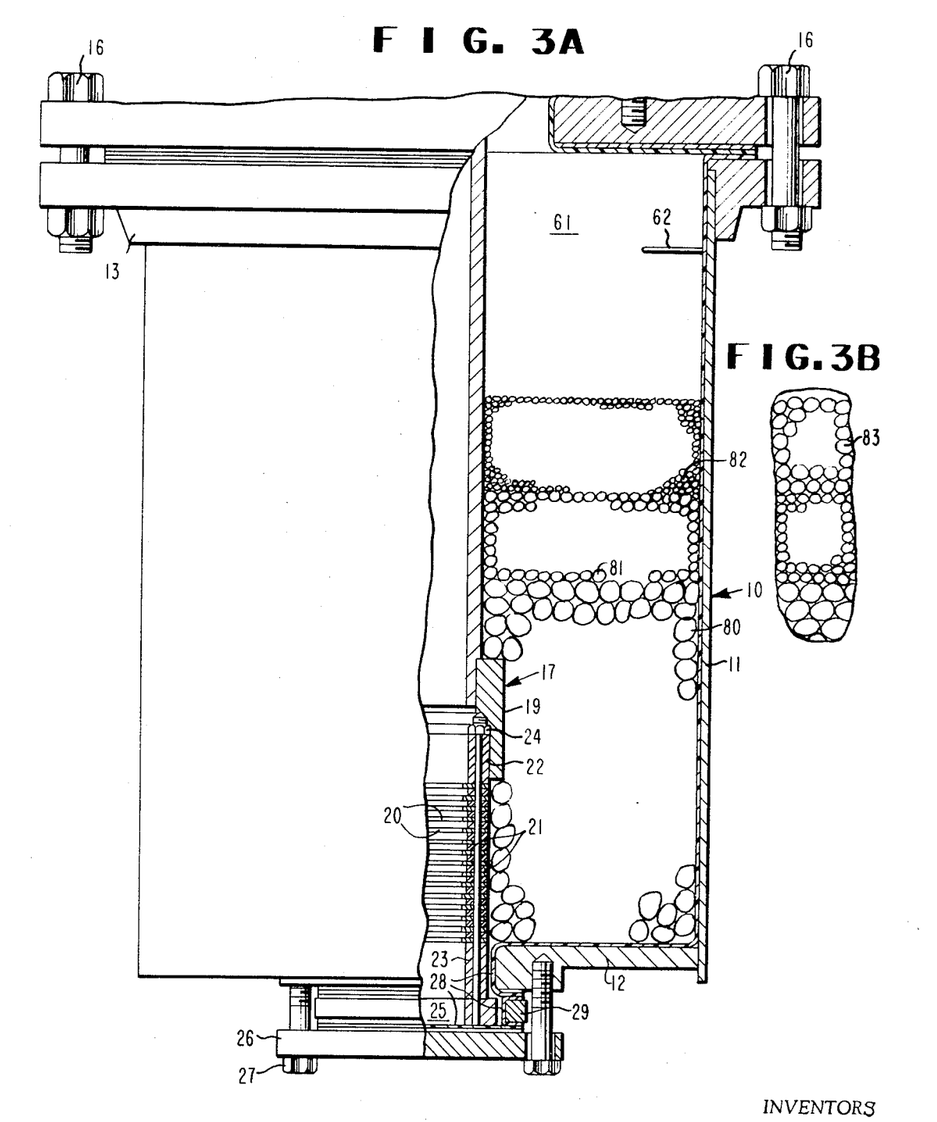
FIG. 3A is a partial cross-sectional side view of a second embodiment of the present invention characterized by the use of two support beds.
FIG. 3B is a fragmentary view of an alternative to the bed structure shown in FIG. 3A, characterized by the use of a large particle filter bed.

FIG. 3A shows a filter similar to that shown in FIG. 1 except that three beds rather than two are used. The bottom bed is composed of support particles 80 having a diameter of about 1.125 inches; the middle bed of support particles 81 having a diameter of about 0.375 inch and the top, or filter bed of particles 82 having a diameter of 0.125 inch. The upper surface of the top support bed is disposed above the uppermost opening of the drain structure by a distance just slightly greater than the distance between the drain structure and the walls of the container. The relative thickness of the two support beds is 1:3, and the filter bed is about equal in thickness with the top support bed.

FIG. 3B shows an alternative construction of the filter shown in FIG. 3A. In this embodiment, the filter bed is composed of particles 83 having a 0.75 inch diameter rather than a 0.125 inch diameter, and the upper support bed is composed of particles 81 having the same diameter as in FIG. 3A, i.e., 0.375 inch, but they are made from a material with a much higher specific gravity. This is the "ideal" filter configuration discussed above.

What is claimed is:

1. A filter assembly, for use in a process stream, that can be cleaned by a fluidizing backflow, comprising:
    a. an elongated cylindrical container with an opening in its base and an opening in its top;
    b. a hollow upright cylindrical drain structure disposed in a leak-tight manner within the opening in the base of said container and extending into said container, said drain structure having a plurality of openings providing the sole direct connection between the interior of said drain structure and the interior of said container;
    c. a plurality of support particles, each having a diameter of about 0.10 to 2.25 inches disposed within said container to form a support bed surrounding said drain structure, the upper surface of said support bed being disposed above the uppermost opening in said drain structure by a distance equal to at least the distance between said drain structure and the walls of said container;
    d. a plurality of filter particles each being adapted to settle more slowly in a liquid than said support particles and being disposed within said container in a manner such that, in the absence of said fluidizing backflow, they form a filter bed for removing contaminants from said process stream, the upper surface of said filter bed being substantially below the top of said container;
    e. input means for introducing said process stream into the opening in the top of said container; and
    f. output means connected to the interior of said drain structure for receiving said process stream after it has passed through said filter and for introducing said fluidizing backflow into said filter assembly, said input means being further adapted to receive said fluidizing backflow after it has passed through said filter assembly.

2. The filter assembly of claim 1 wherein said filter particles have a diameter of about one half to about one fourth of the diameter of the smallest particles in said support bed.

3. The filter assembly of claim 2 wherein said filter and support particles are substantially spherical particles made from materials having approximately the same specific gravity.

4. The filter assembly of claim 2 wherein said drain structure comprises a plurality of disc-shaped rings and a plurality of spacers, said disc-shaped rings being disposed directly above one another and displaced from one another by said spacers in a manner such that the separation between said disc-shaped rings provides the openings in said drain structure connecting the interior of said container to the interior of said drain structure.

5. The filter assembly of claim 2 further comprising means for breaking up said filter bed into individual particles when said fluidizing backflow causes said filter bed to move upward in said container.

6. The filter assembly of claim 2 in which said support bed comprises at least two support beds one of which is disposed on top of the other, and in which the diameter of the particles in the upper support bed is about one third of the diameter of the particles in the lower support bed.

7. The filter assembly of claim 6 in which the thickness of the upper support bed is at least one quarter of the thickness of the lower support bed.

8. The filter assembly of claim 6 in which the filter bed and the lower support bed are comprised of particles made from a material having one specific gravity and the upper support bed is comprised of particles made from a material having a second specific gravity greater than said first specific gravity.

9. The filter assembly of claim 8 wherein said filter particles and said lower support bed particles are made from glass having a specific gravity of about 1.8 and said upper support bed particles are made from a glass having a specific gravity of about 3.5 to 4.5.

10. The filter assembly of claim 1 wherein said filter particles have a larger diameter and a lower specific gravity than the smallest particle in said support bed.

11. A filter assembly for use in a process line that can be cleaned by a fluidizing backflow, comprising:
   a. an elongated cylindrical container with an opening in its top;
   b. a hollow upright, cylindrical drain structure disposed within said container extending from the top of said container to the base of said container, said drain structure having a plurality of openings in the portion thereof near the base of said container providing the sole direct connection between the interior of said drain structure and the interior of said container;
   c. a plurality of support particles, each having a diameter of about 0.10 to 2.25 inches, disposed within said container to form a support bed of said support particles surrounding said drain structure, the upper surface of said support bed being disposed above the uppermost opening in said drain structure by a distance equal to at least the distance between said drain structure and the walls of said container;
   d. a plurality of filter particles each being adapted to settle more slowly in a liquid than said support particles and being disposed within said container in a manner such that, in the absence of said fluidizing backflow, they form a filter bed adapted to remove contaminants from said process stream, the upper surface of said filter bed being substantially below the top of said container;
   e. a top structure disposed in a leak-tight manner over said opening in the top of said container and having at least two ports; and
   f. means adapted to simultaneously connect at least one of said ports in said top structure directly to the interior of said container through the opening in the top of said container and connect at least one other of said ports in said top structure to said drain structure in a leak-tight manner, whereby a continuous leak-tight path is provided between at least two of said ports through the interior of said drain structure and the interior of said container.

12. The filter assembly of claim 11 wherein said filter particles have a diameter of about one half to about one fourth of the diameter of the smallest particles in said support bed.

13. The filter assembly of claim 12 wherein:
   a. said means is a connecting structure, at least a portion of which is movably mounted in a substantially leak-tight manner within said top structure and is connected to said drain structure, said connecting structure contains two channels one end of one channel being connected to the interior of said drain structure and one end of the other channel being connected to the interior of said container, the other ends of both channels being adapted to be connected to said ports and being disposed with respect to one another in a manner such that said connecting structure can be moved to simultaneously align both channels therein with ports in said top structure; and
   b. said filter further comprises means for rotating said connecting structure to align the channels therein with ports in said top structure; whereby, in one orientation of said connecting structure, the process stream introduced into one port in said top structure passes through the interior of said container into said drain structure from which it is dispensed from said filter through a second port in said top structure; and, in another orientation of said connecting structure, said fluidizing backflow introduced into said filter through one port in said top structure thereafter passes through said drain structure into the interior of said container, in a manner such as to fluidize said support bed and said filter bed, from which it is dispensed from said container through another port in said top structure.

14. The filter assembly of claim 13 wherein said drain structure is connected to the base of said container and wherein said connecting structure is movably connected to said drain structure.

15. The filter assembly of claim 13 wherein said top structure contains three ports, each being disposed with respect to another at the same specific angle, and wherein the ends of the channels in said connecting structure adapted to be connected to said ports are disposed with respect to one another at said specific angle; whereby, in one orientation of said connecting structure, said process stream is introduced into said filter through a first one of said ports and dispensed from said filter through a second one of said ports after having passed through the interior of said container, said filter bed, said support bed and said drain structure; and, in another orientation of said connecting structure, said process stream is introduced into said filter through said first port and dispensed from said filter through a third one of said ports after having passed through said drain structure and the interior of said container in a manner such as to fluidize both said support bed and said filter bed.

16. The filter assembly of claim 12 wherein said drain structure comprises a plurality of disc-shaped rings and a plurality of spacers, said disc-shaped rings being disposed directly above one another and displaced from one another by said spacers in a manner such that the separation between said disc-shaped rings provides the openings in said drain structure connecting the interior of said container to the interior of said drain structure.

17. The filter assembly of claim 12 in which said support bed comprises at least two support beds one of which is disposed on top of the other, and in which the diameter of the particles in the upper support bed is about one third of the diameter of the particles in the lower support bed.

18. The filter assembly of claim 17 in which the thickness of the upper support bed is at least one quarter of the thickness of the lower support bed.

19. The filter assembly of claim 17 in which the filter bed and the lower support bed are comprised of particles made from a material having one specific gravity and the upper support bed is comprised of particles made from a material having a second specific gravity greater than said first specific gravity.

20. The filter assembly of claim 19 wherein said filter particles and said lower support bed particles are made from glass having a specific gravity of about 1.8 and said upper support bed particles are made from a glass having a specific gravity of between 3.5 and 4.5.

* * * * *